United States Patent
Pau et al.

(10) Patent No.: US 9,569,695 B2
(45) Date of Patent: Feb. 14, 2017

(54) ADAPTIVE SEARCH WINDOW CONTROL FOR VISUAL SEARCH

(71) Applicant: STMicroelectronics S.r.l., Agrate Brianza (IT)

(72) Inventors: Danilo Pietro Pau, Sesto San Giovanni (IT); Paolo Pasteris, Occhieoppo Inferiore (IT); Mirko Falchetto, Milzano (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 317 days.

(21) Appl. No.: 13/869,656

(22) Filed: Apr. 24, 2013

(65) Prior Publication Data

US 2013/0279762 A1 Oct. 24, 2013

Related U.S. Application Data

(60) Provisional application No. 61/637,543, filed on Apr. 24, 2012.

(51) Int. Cl.
*H04N 19/57* (2014.01)
*G06K 9/62* (2006.01)
(Continued)

(52) U.S. Cl.
CPC .............. *G06K 9/6228* (2013.01); *G06K 9/32* (2013.01); *G06K 9/46* (2013.01); *G06T 7/0028* (2013.01);
(Continued)

(58) Field of Classification Search
CPC ....... G06T 7/20; G06T 7/2013; G06K 9/6217; G06K 9/00335; G06K 2209/01; G06K 9/00288; G06K 9/00221; H04N 19/61;H04N 19/51; H04N 5/145; H04N 19/56; H04N 19/57
See application file for complete search history.

(56) References Cited

U.S. PATENT DOCUMENTS 5,694,334 A 12/1997 Donahue et al.
5,842,194 A * 11/1998 Arbuckle ............. G06K 9/6857
382/224

(Continued)

OTHER PUBLICATIONS

Kim et al., Computer Control by Tracking Head Movements for the Disabled, 2006 [retrieved Jun. 21, 2016], Lecture Notes in Computer Science:Computers Helping People with Special Needs: Proceedings: 10th International Conference, vol. 4061, pp. 709-715. Retrieved from the Internet: http://link.springer.com/chapter/10.1007/11788713_104.*

(Continued)

*Primary Examiner* — Matthew Bella
*Assistant Examiner* — Dennis Rosario
(74) *Attorney, Agent, or Firm* — Seed IP Law Group LLP (57) ABSTRACT

Image-processing apparatus and methods to adaptively control a size and/or location of a visual search window used for feature matching in a machine-vision system are described. A search window controller may receive motion vector data and image recognition rate data, and compute a search window size and/or search window location based on the received data. The computed search window size may be a portion of an image frame. The motion vector data and image recognition rate data may be computed from one or more images in a video image sequence. By adaptively controlling search window size and location, an appreciable reduction in data processing burden for feature matching may be achieved.

20 Claims, 6 Drawing Sheets

(51) Int. Cl.
　　　*G06T 7/20*　　　(2006.01)
　　　*G06K 9/46*　　　(2006.01)
　　　*G06T 7/00*　　　(2006.01)
　　　*G06K 9/32*　　　(2006.01)
　　　*G06K 9/36*　　　(2006.01)

(52) U.S. Cl.
　　　CPC ............. *G06T 7/2033* (2013.01); *H04N 19/57* (2014.11); *G06K 2009/363* (2013.01)

(56) References Cited

U.S. PATENT DOCUMENTS

| | | | |
|---|---|---|---|
| 6,115,494 | A | 9/2000 | Sonoda et al. |
| 6,480,626 | B1 * | 11/2002 | Venable ................ 382/180 |
| 6,639,624 | B1 | 10/2003 | Bachelder et al. |
| 6,667,766 | B2 | 12/2003 | Matsutani et al. |
| 6,687,402 | B1 | 2/2004 | Taycher et al. |
| 6,711,293 | B1 | 3/2004 | Lowe |
| 6,750,871 | B2 * | 6/2004 | Nishikawa ............ 345/544 |
| 6,810,293 | B1 | 10/2004 | Chou et al. |
| 6,871,409 | B2 | 3/2005 | Robb et al. |
| 6,971,066 | B2 | 11/2005 | Schultz et al. |
| 7,073,158 | B2 | 7/2006 | McCubbrey et al. |
| 7,460,686 | B2 * | 12/2008 | Yoda et al. ............ 382/103 |
| 7,587,699 | B2 | 9/2009 | McCubbrey |
| 7,769,236 | B2 | 8/2010 | Fiala |
| 7,822,264 | B2 | 10/2010 | Balslev et al. |
| 7,860,387 | B2 | 12/2010 | Ishikawa |
| 8,126,190 | B2 | 2/2012 | Jung et al. |
| 8,270,671 | B1 | 9/2012 | Medasani et al. |
| 8,421,868 | B2 * | 4/2013 | Hamada ............... 348/208.1 |
| 8,456,327 | B2 | 6/2013 | Bechtel et al. |
| 8,792,673 | B2 | 7/2014 | Levien et al. |
| 2004/0060032 | A1 | 3/2004 | McCubbrey |
| 2004/0136611 | A1 | 7/2004 | Reiners |
| 2006/0206850 | A1 | 9/2006 | McCubbrey |
| 2007/0241863 | A1 | 10/2007 | Udagawa et al. |
| 2007/0273766 | A1 | 11/2007 | Wilson |
| 2007/0280547 | A1 | 12/2007 | Mitsui |
| 2008/0056607 | A1 | 3/2008 | Ovsiannikov |
| 2008/0101715 | A1 | 5/2008 | Barnes et al. |
| 2008/0181457 | A1 | 7/2008 | Chattopadhyay et al. |
| 2008/0239330 | A1 | 10/2008 | Sato |
| 2008/0267506 | A1 | 10/2008 | Winder |
| 2008/0291274 | A1 | 11/2008 | Merkel et al. |
| 2008/0298689 | A1 | 12/2008 | Ashbrook et al. |
| 2010/0020223 | A1 | 1/2010 | Vice |
| 2010/0215266 | A1 | 8/2010 | Higuchi |
| 2010/0232643 | A1 | 9/2010 | Chen et al. |
| 2011/0044543 | A1 | 2/2011 | Nakamura et al. |
| 2011/0103458 | A1 | 5/2011 | Huang et al. |
| 2011/0228846 | A1 | 9/2011 | Eilat et al. |
| 2012/0050074 | A1 | 3/2012 | Bechtel et al. |
| 2012/0140233 | A1 | 6/2012 | Rockwell et al. |
| 2012/0163672 | A1 | 6/2012 | McKinnon |
| 2012/0182392 | A1 | 7/2012 | Kearns et al. |
| 2012/0183224 | A1 | 7/2012 | Kirsch |
| 2013/0088426 | A1 | 4/2013 | Shigeta et al. |
| 2013/0250113 | A1 | 9/2013 | Bechtel et al. |
| 2013/0279751 | A1 | 10/2013 | Bruna et al. |
| 2013/0279762 | A1 | 10/2013 | Pau et al. |
| 2013/0293469 | A1 | 11/2013 | Hakoda et al. |
| 2013/0301930 | A1 | 11/2013 | Vigliar et al. |
| 2013/0301950 | A1 | 11/2013 | Vigliar et al. |
| 2013/0322524 | A1 | 12/2013 | Jang et al. |
| 2014/0002658 | A1 | 1/2014 | Kim et al. |
| 2014/0185910 | A1 | 7/2014 | Bryll et al. |
| 2014/0293091 | A1 | 10/2014 | Rhoads et al. |

OTHER PUBLICATIONS

Chen et al., Hardware Oriented Content-Adaptive Fast Algorithm for Variable Block-Size Integer Motion Estimation in H.264, Dec. 13-16, 2005 [retrieved Sep. 9, 2016], Proceedings of 2005 Intern Symp on Intellig Sign Process and Communic Systems, pp. 341-344. Retrieved from the Internet: http://ieeexplore.ieee.org/document/1595416/?arnumber=1595416.*

Chen et al. ,Hardware Oriented Content-Adaptive Fast Algorithm for Variable Block-Size Integer Motion Estimation in H.264, Dec. 13-16, 2005 [retrieved Sep. 26, 2016], Proceedings of 2005 International Symposium on Intelligent Sig Proc and Comm Sys, pp. 341-344. Retrieved Internet: http://ieeexplore.ieee.org/document/1595416/?arnumber=1595416&tag=1.*

"Hamming distance," retrieved from http://en.wikipedia.org/wiki/Hamming_distance on Jul. 30, 2014, 3 pages.

Basu, "Gaussian-Based Edge-Detection Methods—A Survey," *IEEE Transaction on Systems, Man, and Cybernetics—Part C:Applications and Reviews 32*(3):252-260, Aug. 2002.

Bonato et al., "A Parallel Hardware Architecture for Scale and Rotation Invariant Feature Detection," *IEEE Transactions on Circuits and Systems for Video Technology 18*(12): 1703-1712, Dec. 2008.

Calonder et al., "BRIEF: Computing a Local Binary Descriptor Very Fast," *IEEE Transactions on Pattern Analysis and Machine Intelligence 34*(7):1281-1298, Jul. 2012.

Hess, "An Open-Source SIFT Library," ACM Proc. of the Int. Conference on Multimedia (MM), Florence, Italy, 2010, http://robwhess.github.io/opensift/, 4 pages.

Huang et al., "High Performance SIFT Hardware Accelerator for Real-Time Image Feature Extraction," *IEEE Transactions on Circuits and Systems for Video technology 22*(3):340-351, Mar. 2012.

Huggett et al., "A Dual-Conversion-Gain Video Sensor with Dewarping and Overlay on a Single Chip," IEEE International Solid-State Circuits Conference (ISSCC) 2009, Session 2—Imagers 2.8, pp. 52-54.

Lowe, "Distinctive Image Features from Scale-Invariant Keypoints," *International Journal of Computer Vision 60*(2):91-110, 2004.

Mizuno et al., "A Low-Power Real-Time SIFT Descriptor Generation Engine for Full-HDTV Video Recognition," *IEICE Trans. Electron E94-C*(4):448-457, Apr. 2011.

O'Shea, "Bachet's Problem: As Few Weights to Weigh Them All," arXiv: 1010.5486v1 [math.HO], Oct. 26, 2010, pp. 1-15.

Park, "Communication: The *r*-complete partitions," *Discrete Mathematics 183*:293-297, 1998.

Rosten et al., "Faster and Better: A Machine Learning Approach to Corner Detection," *IEEE Transactions on Pattern Analysis and Machine Intelligence 32*(1):105-119, Jan. 2010.

U.S. Appl. No. 13/869,639, filed Apr. 24, 2013, Bruna et al.
U.S. Appl. No. 13/869,665, filed Apr. 24, 2013, Vigliar et al.
U.S. Appl. No. 13/869,609, filed Apr. 24, 2013, Vigliar et al.
U.S. Appl. No. 13/869,652, filed Apr. 24, 2013, Pau et al.

Pettersson et al., "Online Stereo Calibration using FPGAs," Proceedings of the IEEE Intelligent Vehicles Symposium, Jun. 6-8, 2005, pp. 55-60.

ProDSP Technologies, "Event Detection Intelligent Camera," retrieved from http://www.prodsp.hu/event-detection-intelligent-camera/ on Feb. 9, 2015, 5 pages.

Lai et al., "Proposed FPGA Hardware Architecture for High Frame Rate (>100 fps) Face Detection Using Feature Cascade Classifiers," First IEEE International Conference on Biometrics: Theory, Applications, and Systems, Crystal City, VA, Sep. 27-29, 2007, 6 pages.

Lucas et al., "An Iterative Image Registration Technique with an Application to Stereo Vision," From *Proceedings of Imaging Understanding Workshop*, pp. 121-130, 1981.

Wikipedia, "Motion Estimation," last modified Mar. 24, 2015, retrieved from https://en.wikipedia.org/w/index.php?title—Motion_estimation&oldid=653287956, on Nov. 10, 2015, 2 pages.

Bradski et al., *Learning OpenCV Computer Vision with the OpenCV Library 1st Edition*, Loukides (ed.), Sebastopol, California, O'Reilly Media, Inc., Sep. 2008, pp. 1-555.

* cited by examiner

ADAPTIVE SEARCH WINDOW CONTROL FOR VISUAL SEARCH

CROSS-REFERENCE TO RELATED APPLICATIONS APPLICATION

This application claims the benefit of U.S. provisional application Ser. No. 61/637,543, filed on Apr. 24, 2012, which application is incorporated herein by reference to the maximum extent allowable by law.

BACKGROUND

Technical Field

The technology relates to machine vision, and to electronic processing of captured images to adaptively control search window sizes used for feature matching between successive images in an image sequence. The feature matching may be used to generate optical flow data.

Discussion of the Related Art

The detection of interest points within electronically-captured images and feature matching between images is useful for a variety of computer-vision applications. For example, interest point detection and feature matching may be used in machine-implemented methods for localization, mapping, tracking, and/or object recognition. Examples of interest points include, without being limited to, edges, corner, ridges, localized contrasted regions and blobs. Features associated with the interest points identified in a first image may be tested for matches with features of one or more other images based at least in part upon a comparison of descriptor data generated for interest points for the first and second images. For successful machine-vision applications, an appreciable number of interest points (e.g., hundreds or thousands) may be required to be identified and processed per image frame. When features are compared from image to image, a comparison of one feature from a first image may be compared against all features of one or more other images, and the process repeated for each feature of the first image. As may be appreciated, the comparison of features from image to image may entail a substantial number of numerical computations.

SUMMARY

Methods and apparatus for adaptively controlling search windows that are used for feature matching between images in machine-vision applications are described. The images may be successive images of a video sequence. The size of a search window may be controlled to be a sub-region of an image frame, and the search window location may be dynamically determined based upon a motion vector determined for and associated with one or more sub-regions evaluated for at least one prior image. In some embodiments, the search window size may be adaptively controller and based at least in part on a feature-matching recognition rate. By adaptively controlling search window size and location, a number of feature-matching computations may be reduced in an image-processing system that is used to compute optical flow, for example.

According to some embodiments, an image processing system having at least one processor adapted to implement search window control comprises a search window controller configured to receive motion vector data for a first sub-region of a first processed image frame. The search window controller may be further configured to compute a search window location, for matching features in a second image frame, based at least in part on the received motion vector data. In some implementations, the search window controller may be further configured to compute the search window size for the second image frame based at least in part on the received motion vector data and recognition rate data received from a feature matcher.

In some embodiments, an image processing method for matching features of at least two images and controlling at least one parameter of a visual search window by at least one processor may comprise receiving motion vector data, by a search window controller, for a first sub-region of a first processed image frame, and computing, by the search window controller, a search window location for a second image frame based at least in part on the received motion vector data. In some implementations, the method may further comprise computing, by the search window controller, a search window size for the second image frame based at least in part on received recognition rate data and the received motion vector data.

In various embodiments, visual search window control may be implemented as computer-readable medium that includes machine-readable instructions that, when executed by at least one processor, adapt the at least one processor to receive motion vector data for a first sub-region of a first processed image frame, and compute a search window location for a second image frame based at least in part on the received motion vector data. In some implementations, the machine-readable instructions further adapt the at least one processor to compute a search window size for the second image frame based at least in part on received recognition rate data and the received motion vector data.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing.

DETAILED DESCRIPTION

Image-processing systems and methods are described that adaptively control a size and/or location of visual search windows used for machine-vision applications. The systems and methods may be useful for video data in which a sequence of images are captured and processed to generate optical flow data. The optical flow data may be utilized in machine-vision applications relating to mobile communications, automotive technology, surveillance technology, machine automation and control, video gaming, infotainment, and other technologies that may implement object recognition and/or tracking. Adaptive control of visual search windows may reduce the computational burden on image-processing systems by selectively reducing the amount of image-related data (e.g., descriptor data) searched when evaluating matching of image features.

Figure 1A:
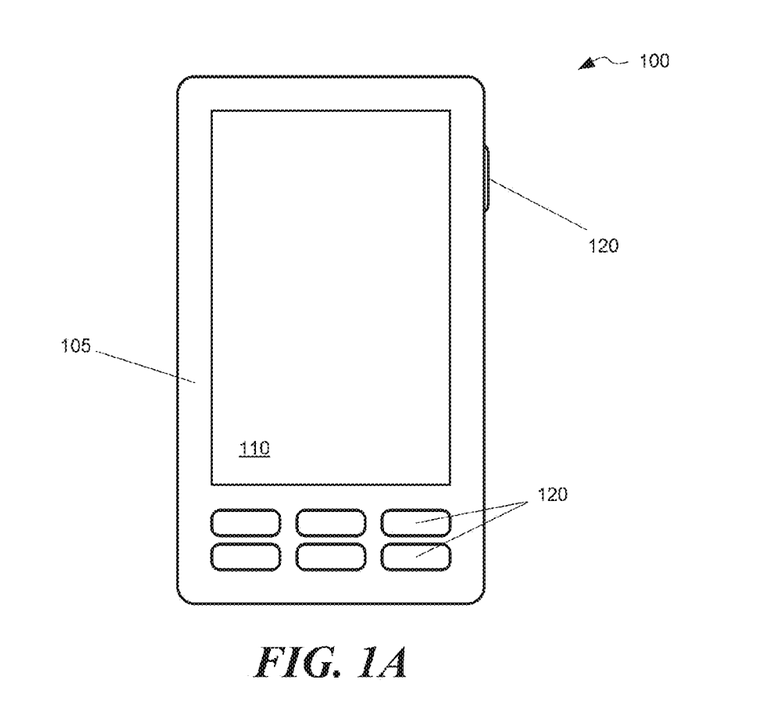
FIG. 1A depicts a device in which embodiments of the present technology may be implemented.

FIG. 1A depicts a device 100 (e.g., a smart phone, camera, personal digital assistant, pad or tablet computer) in which embodiments of adaptive search window control may be implemented. The device may be a hand-held device, or may be a larger electronic device such as a laptop or personal computer. In some embodiments, components of the device 100 may be distributed or integrated in a larger apparatus, such as a vehicle, surveillance system, or an electronic gaming system. In some implementations, the device 100 may include a casing 105 and display screen 110, which may be a touch screen. The device may contain one or more operational buttons 120 that may be used to operate the device. Within the casing 105 may be complex digital and analog circuitry configured to provide a variety of operational functions, e.g., still and/or video image recording, audio recording, graphic display on the screen 110, audio reproduction, numerical computation, word processing, and electronic communications with other devices in a network.

Figure 1B:
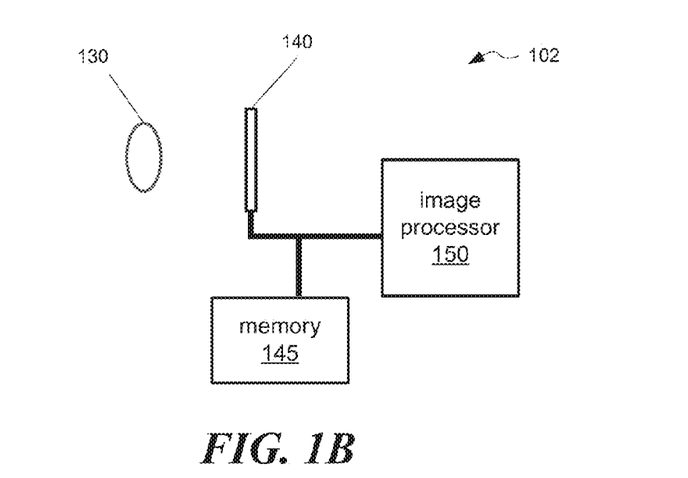
FIG. 1B depicts components of an image capture apparatus, according to some embodiments.

According to some embodiments, the device 100 may include image-capture apparatus 102, as depicted in FIG. 1B. The image-capture apparatus may comprise at least one optical lens 130 and at least one sensor array 140. The sensor array 140 may comprise a CMOS photosensor array, or any other suitable photosensing array, comprising a plurality of imaging pixels that are configured to convert incident photons that are integrated over a short, predetermined time interval into an electronic signal. The signal may be read out from each pixel in the sensor array 140. Data read from the pixels may be stored in memory 145 and/or provided to an image processor 150. The data read from pixels may be formatted into a frame format, or any suitable format, and be representative of a captured image. The data may contain monochrome information and/or color information that may be used to reproduce the captured image.

Next-generation devices that include improvements to devices like those described above in connection with FIG. 1A may include video analytics capabilities. With video analytics, the devices may be used for various applications, including but not limited to, mobile computing and/or communications, automotive applications, electronic gaming-related visual search, infotainment, printing applications, and surveillance. Video analytics capabilities may require interest point detection and analysis of still images and/or image sequences obtained in video filming. When analyzing image sequences, optical flow data may be generated and used downstream to further implement a machine-vision application.

Figure 2:
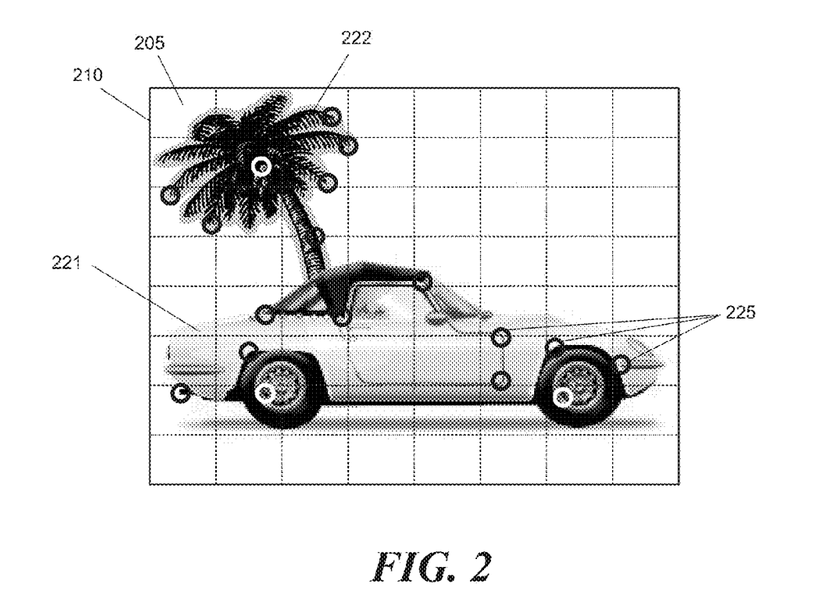
FIG. 2 portrays an electronically captured two-dimensional image of objects, in which the image frame 210 is partitioned into a plurality of sub-regions 205.

For explanatory purposes, FIG. 2 portrays a captured image frame 210 that includes a first object 221 (an auto) and a second object 222 (a tree). Also depicted, as circles, are a number of interest points 225 that may have been detected during machine analysis of the image. An interest point may be identified by a single pixel location, e.g., ($P_x$, $P_y$), where $P_x$ and $P_y$ are integers that identify the pixel location in a pixelated image, according to some embodiments. In a practical application, there may be many more interest points detected in an image than shown in FIG. 2, e.g., hundreds or thousands. For example, the number of interest points identified in an image may be between about 100 and about 500 in some embodiments, between about 500 and about 2000 in some embodiments, and between about 2000 and about 10000 in some embodiments, and yet between about 10000 and about 50000 in some embodiments.

Image-processing steps for machine-vision applications may be associated with each interest point 225. For example, descriptor data may be generated for some or all of the identified interest points. Any one or combination of algorithms may be used to identify interest points and generate descriptor data. One algorithm, referred to as Scale-Invariant Feature Transform (SIFT), may be used to identify interest points and generate associated descriptor data for each interest point. The descriptor may be a data string that is substantially independent from geometric transformation. (See, for example, David G. Lowe, "Distinctive Image Features from Scale-Invariant Keypoints", International Journal of Computer Vision, 60, 2 (2004), pages 91-110, which is incorporated herein by reference in its entirety). Another algorithm, referred to as Compressed Histogram of Gradients (CHoG), provides a solution in a compressed image domain. It is designed to provide good performance with reduced-size data sets for features. Another algorithm, referred to as Speeded Up Robust Features (SURF), represents an improvement in speed over SIFT and provides fast feature detection with robustness to certain image transformations, and with less computational resources. In some embodiments, descriptor data may be generated using an algorithm described by M. Calonder et al. in "BRIEF: Computing a local binary descriptor very fast," *IEEE Transactions on Pattern Analysis and Machine Intelligence*, vol. 34, num. 7, pp. 1281-1298 (2011), or by E. Rosten et al. in "Faster and better: a machine learning approach to corner detection," *IEEE Transactions on Pattern Analysis and Machine Intelligence*, Vol. 32, Issue 1, pp. 105-119 (2010), both articles which are incorporated herein by reference in their entirety. Other algorithms that may be used to detect interest points and/or generate descriptors include, but are not limited to, Harris, Shi-Tommasi, and difference of Hessian algorithms. Regardless of how the interest points are identified and how the descriptors are generated, the interest points and/or descriptors may be used to evaluate a matching of features between two or more images, so as to identify and/or track objects in one or more images.

As noted above and recognized by the inventors, feature matching between images can require a substantial amount of machine processing resources. For example, in some implementations, accurate machine-vision performance may require about 1024 interest points to be detected per image frame. In some cases, descriptor data associated with one interest point may require data from an N×M pixel region around the interest point, where N=M=16. Assuming that a binary descriptor of 256 bits is computed for each interest point, and 2 frames are compared, then the amount of memory needed for the descriptor data alone is over 0.5 megabits (Mb). In some embodiments, N and M may each be any integer value and may or may not be equal to each other, so that the amount of memory needed for the descriptor data may be more or less than 0.5 Mb. When evaluating feature matches between two images, a first feature of one image (e.g., a feature associated with at least 256 bits of data) may be compared against all descriptor data in a second image (about 0.25 Mb) in an unsupervised "full-image search." The process may then be repeated for all the remaining features of the first image. This approach amounts to comparing all interest points of one image against all interest points of a second image. As can be appreciated, a large amount of data and an appreciable number of numerical operations must be performed to evaluate feature matches between images.

The inventors have recognized that full-image searching may be necessary when the images to be compared are non-consecutive images, e.g., images captured at appreciably different times in which there may be appreciable transformation between the images, e.g., significant changes in lighting, insignificant temporal correlation. The inventors have also recognized that for video images, there may be lighting constancy, temporal persistence, and spatial coherence such that feature movement can be tracked and predicted from frame to frame. Accordingly, a visual search window used when comparing features of successive images in a video sequence need not be a full-image or full-frame window. In some implementations, a visual search window may be reduced in size to a sub-region of an image frame and its location calculated, so that a feature of one image can be compared against a significantly reduced number of features in the calculated sub-region of the second image frame during feature matching. By adaptively controlling and reducing the search window size, the image-processing burden can be reduced.

A countervailing factor to data reduction in machine-vision applications is "recognition rate." Recognition rate R is generally defined as a ratio of a number of matched interest points $P_m$ to a total number of identified interest points T in a frame, and may be expressed as the following relation.

$$R = \frac{P_m}{T} \quad (1)$$

The value of R typically ranges from 0 to 1, where a value near 1 indicates a higher probability that compared images contain matching features that can be recognized and/or tracked by a machine-vision application. A match between interest points may be determined using any suitable feature-matching algorithm, e.g., by computing a Hamming distance between binary descriptors as described in the article by Calonder et al. referenced above, or as described at the internet site http://en.wikipedia.org/wiki/Hamming_distance. Matches may be identified based at least in part upon a value of a minimum Hamming distance, for example. In some embodiments, a determination of best matches may comprise a process of separation between successful matches (inliers) and unsuccessful matches (outliers), e.g., with respect to a predetermined or calculated threshold, in order to identify positive matches.

If a search window is made too small, there may be too few interest points (e.g., too little data) in the search window for matching, and the recognition rate R may fall to a lower value indicating inadequate feature matching for satisfactory machine-vision performance. If a search window is sized too large, unnecessary matching computations may be performed that unnecessarily burden an image processor. It is desirable to size and locate a search window to contain enough interest points to yield enough matched points $P_m$ in order to increase the probability that features between two compared images will be accurately recognized or not recognized.

Figure 3A:
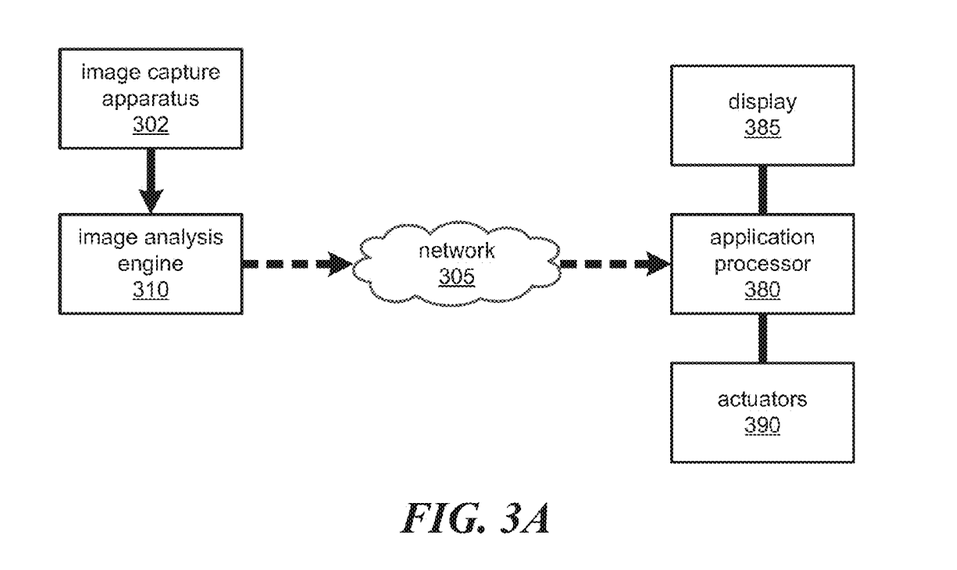
FIG. 3A depicts an image processing system, according to some embodiments.
Figure 3B:
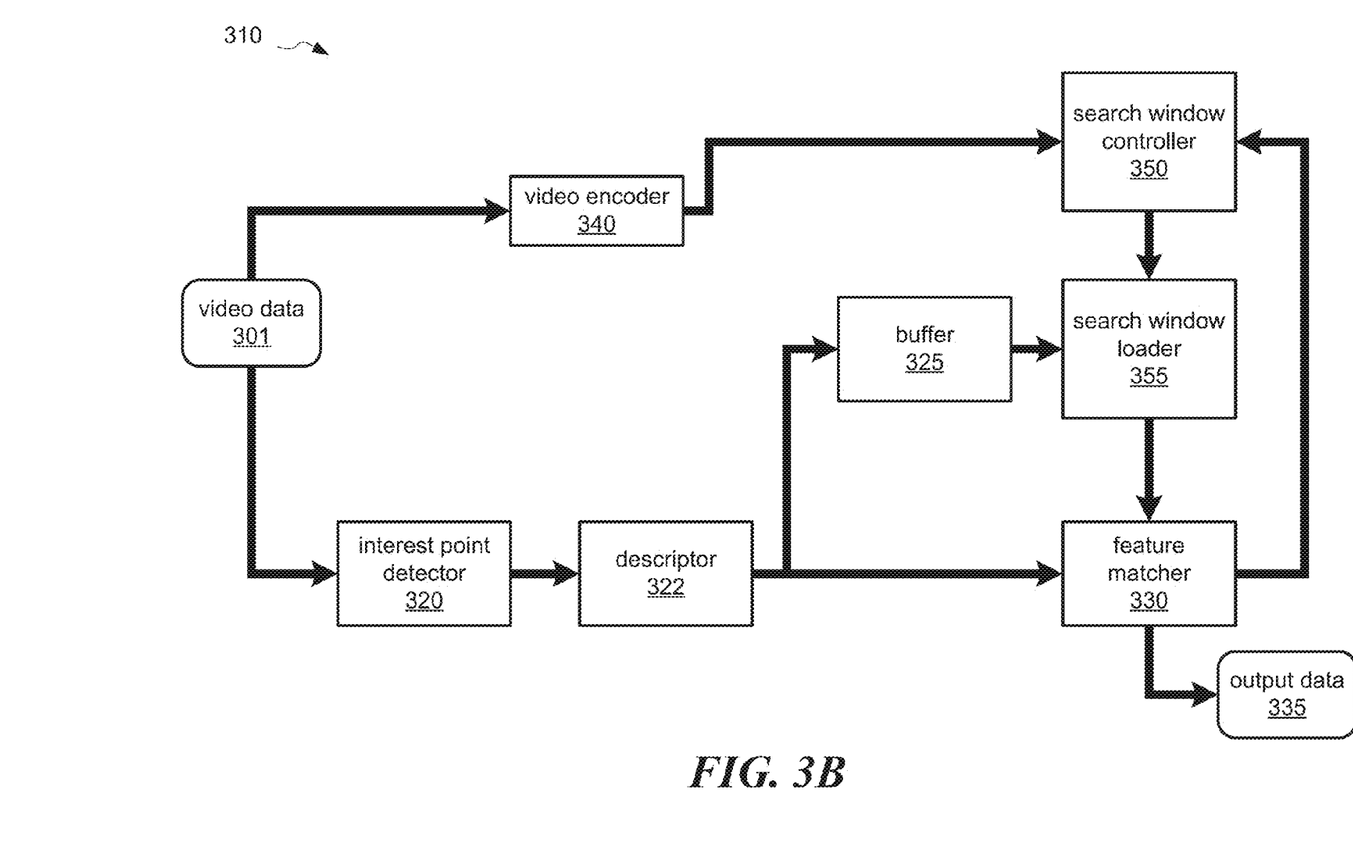
FIG. 3B depicts components of an image analysis engine configured to implement adaptive search window control, according to some embodiments.

An apparatus with video analytics capabilities and configured to adaptively control at least one parameter of a visual search window may include some or all of the system components shown in FIGS. 3A and 3B, in some embodiments. According to some embodiments, the apparatus may include image capture apparatus 302, e.g., image capture apparatus as described above in connection with FIG. 1B, and an image analysis engine 310. The image analysis engine 310 may be configured to adaptively control a search window, and is described in further detail below. In some implementations, data from the image analysis engine 310 may be communicated to an application processor 380 that may be configured to run one or more machine-vision applications. The data from the image analysis engine may be communicated via a network link 305, which may comprise a data bus, a local area network, a medium area network, or a wide area network (e.g., the internet).

Application processor 380 may comprise digital and/or analog hardware, software executing on at least one processor, one or more field-programmable gate arrays, or a combination thereof that is specially adapted to receive machine-vision data (e.g., optical flow) and execute one or more processes based on and responsive to the received machine-vision data. The application processor 380 may be in communication with a display 385 and one or more actuators 390. In some embodiments, the application processor 380 may generate commands to activate actuators 390 of a mechanical system, e.g., actuators in an automobile. The application processor 380 may also generate information to be displayed on the display 385.

FIG. 3B shows further details of the image analysis engine 310. The image analysis engine may comprise a video encoder 340, a search window controller 350, a search window loader 355, an interest point detector 320, a descriptor 322, a buffer 325, and a feature matcher 330. In overview, the image analysis engine 310 may be configured to receive video data 301, e.g., streamed video data, and communicate the video data to the video encoder 340 and interest point detector 320. Video encoder 340 may encode the video data into a format for transmission or storage, e.g., a MPEG, H264, or other suitable format, and among other things calculate a motion vector for at least one region of an encoded image. Motion vectors calculated by video encoder 340 may be communicated to the search window controller 350. The interest point detector 320 may identify interest points 225 and communicate interest point data to the descriptor 322. Interest point data, descriptor data, and optionally image data, may be communicated to buffer 325 and feature matcher 330. The feature matcher may be configured to determine matches between interest points of at least two images based upon descriptor data and/or interest point data for the two images. The search window loader 355 may select from buffer 325 and communicate to feature matcher 330 data associated with a sub-region of an image that is to be used by the feature matcher when evaluating matches between features of two images. The feature matcher 330 may output match results along with other data as output data 335. The feature matcher may further communicate recognition rate data R to search window controller 350. Search window controller 350 may be configured to process data from feature matcher 330 and video encoder 340 to adaptively size and locate a visual search window used by feature matcher 330. The size and location of the search window may be communicated to search window loader 355.

With regard to communicating information between system components, a first system component may communicate a value to a second system component in any one of several methods. For example, a first system component may provide an address location or pointer to the second system component identifying where the value is stored, or may place the computed value in an address accessed by the second component and notify the second component when the computed value is available. Alternatively, the first system component may transmit the value as digital or analog data, directly or indirectly, to the second system component.

In further detail, video encoder 340 may comprise digital and/or analog hardware, software executing on at least one processor, one or more field-programmable gate arrays, or a combination thereof configured to encode received video data into a format for transmission or storage, e.g., a MPEG, H264, or any other suitable format. The video encoder 340 may comprise a motion estimator (e.g., a motion estimator as described at http://en.wikipedia.org/wiki/Motion_estimation). The video encoder may be configured to compute motion estimation data for sub-regions 205, or portions thereof, of an image frame 210, referring now to FIGS. 4A and 4B. For example, the video encoder 340 may be configured to parse received image data associated with a video frame into sub-regions $S_{i,j}$ and analyze feature data within a sub-region to compute motion estimation data for the sub-region or portions thereof. A sub-region may contain any number of pixels. The motion estimator may be integrated as part of the video encoder 340, and data from the motion estimator may be used to compute motion vector data.

The term "software" may be used herein to refer to machine-readable instructions that are recognizable and executable by at least one processor. The machine-readable instructions may be embodied in any type of programming language, and stored on at least one manufacture storage device, e.g., RAM, ROM, cache memory, CD-ROM, removable memory devices, etc.

In some embodiments, the video encoder may further be configured to compute one or more motion vectors 410 for each sub-region, and communicate the motion vector information to the search window controller 350. In some implementations, the video encoder may further be configured to communicate the motion estimation data per sub-region 205, and/or a sub-portion thereof, to the search window controller 350 where motion vectors are calculated. Motion estimation data and/or motion vector data may be organized, e.g., in a coherent motion field, and stored in a table or other data structure that associates motion vector and/or motion estimation data with each sub-region or a portion thereof. Motion vectors may be computed based upon sub-region data, a portion of sub-region data, data associated with a single interest point, or full-frame averaged data.

Interest point detector 320 may comprise digital and/or analog hardware, software executing on at least one processor, one or more field-programmable gate arrays, or a combination thereof configured to receive captured video data 301 and process the video data to identify a plurality of interest points 225 in received image frames 210. The video data may be multi-bit, formatted data representative of time-sequenced images captured by image-capture apparatus 302, for example. The interest points may be extracted according to any suitable interest point extraction algorithm as described above, e.g., SIFT, SURF, CHoG, etc. In some embodiments, interest point detector 320 may also determine geometric or orientation parameters associated with a received image, or a region of the image around an associated interest point. For example, the interest point detector 320 may communicate a coordinate position (x, y) for each extracted interest point. The coordinate position may identify the location of the interest point within the captured image, and may be expressed in terms of pixel numbers. In some implementations, the interest point detector may determine one or more rotational values associated with the received image or sub-regions of the image. The rotational values may reflect any one or more of pitch $\theta_x$, yaw $\theta_z$, and roll $\theta_y$ of an object in the image. In some embodiments, the interest point detector 320 may determine one or magnification M values associated with the received image and/or sub-regions of the image.

Figure 4A:
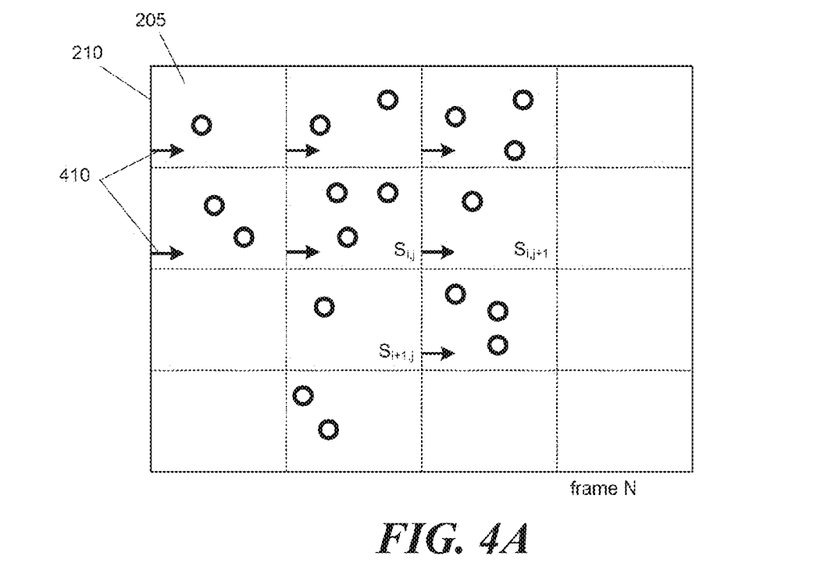
FIGS. 4A-4B illustrate interest points identified in successive image frames, of which some interest points are in motion.
Figure 4B:
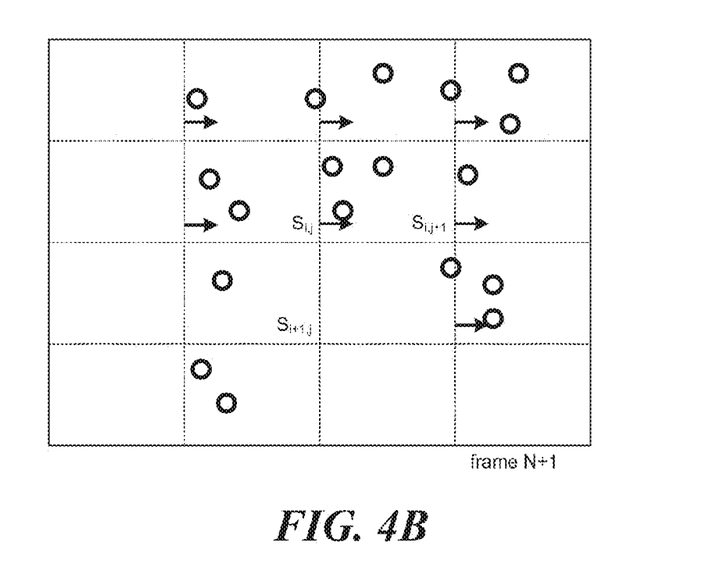

The interest point detector 320 may be configured to analyze received image data by parsing the image data into sub-regions, e.g., sub-regions 205 portrayed in FIG. 2 and FIGS. 4A-4B. There may be any number of sub-regions associated with an image, e.g., between about 10 and about 50 in some embodiments, between about 50 and about 100 in some embodiments, between about 100 and about 250 in some embodiments, and yet more than 250 in some implementations. The sub-regions may be of a same size, or may be of different sizes. The sub-regions 205 may be processed by the interest point detector 320 in an orderly manner, e.g., sequentially along rows or columns, a serpentine manner, expanding outward from a corner or the center of the image. In some embodiments, the sub-regions 205 may be processed by the image point detector 320 in a random access manner.

When processing a $j^{th}$ sub-region 205, the interest point detector 320 may be configured to identify interest points 225 within a sub-region based at least in part on an interest-point threshold value $Th_j$ determined for the sub-region. In some embodiments, the value $Th_j$ may be computed by a rate controller as described in a co-pending application titled "Adaptive Interest Rate Control for Visual Search," which is incorporated herein by reference in its entirety.

The interest point detector 320 may produce interest point data, and communicate the interest point data to one or more downstream components, e.g., descriptor 322 and optionally buffer 325. The interest point data may include any combination of data received and produced by the interest point detector and formatted in any suitable format. In some implementations, interest point data may comprise for any one interest point one or more of the following data: an identifier for the interest point, a position (e.g., pixel coordinates) for the interest point, an orientation of the interest point, and a magnification associated with the interest point. For example, the interest point data for any one interest point may be represented by data values [x, y, $\theta_y$, M]. Additional or less data may be provided for any one interest point. In some embodiments, interest point data may include a number of interest points identified for an image sub-region, an identification of the sub-region, and may further include some or all image data that is received by the interest point detector 320. In some implementations, interest point data may be prepared as metadata and attached to, or associated with, received image data.

Descriptor 322 may comprise digital and/or analog hardware, software executing on at least one processor, one or more field-programmable gate arrays, or a combination thereof configured to generate descriptor data for one or more of the interest points received from the interest point detector 320. Descriptor data may be generated using any suitable descriptor algorithm, such as those used in SIFT, SURF, CHoG, BRIEF, or FAST referenced above. The descriptor data may be provided or identified to a buffer 325 and a feature matcher 330. The descriptor data may be combined with interest point data and/or image data when provided or identified to buffer 325 and feature matcher 330.

Buffer 325 may comprise any suitable type and form of memory element, e.g., RAM, ROM, or cache memory. The memory may be configured in any suitable manner, e.g., FIFO, ring memory, etc. According to some embodiments, the buffer may be sized to store an amount of data associated with at least one image frame, e.g., at least enough memory to store interest point data and descriptor data for one image frame. According to some embodiments, the buffer 325 may be sized to store an amount of data associated with one or two image frames. In some implementations, the buffer 325 may be sized to store only an amount of data associated with two sub-regions of images, where images may be processed and compared on a sub-region by sub-region basis. In some embodiments, buffer 325 may be sized to store additional data, e.g., some or all of received image data from image capture apparatus 302 for additional frames.

In some embodiments, the image processing system may further include a feature matcher 330, as depicted in FIG. 3B. The feature matcher 330 may comprise digital and/or analog hardware, software executing on at least one processor, one or more field-programmable gate arrays, or a combination thereof configured to receive selected amounts of feature data for two images and to compare the feature data to determine whether there are matching features between the two images. The feature data may include interest point data, descriptor data, and/or image data. In some implementations, the feature matcher 330 may be configured to compare at least descriptor data of a feature in a first image, e.g., descriptor data received from descriptor 322, with descriptor data of at least a portion of at least one second, previous image. In some implementations, the at least one second image used by feature matcher may comprise one or more prior images obtained in a sequence of recorded images, e.g. a video sequence. Descriptor data for the second image, or a portion thereof, may be stored in buffer 325.

According to some embodiments, the feature matcher 330 may be configured to compare at least descriptor data received from the descriptor 322 against descriptor data of a stored image to determine a match of, track, or recognize, one or more features in an image. In some embodiments, feature matcher 330 may perform other machine-vision operations. Any suitable feature matching algorithm may be used, e.g., finding a minimum Hamming distance, or using a matching algorithm described in any of the above-cited references. The feature matcher may output match results in output data 335 that may be used by downstream processing apparatus to make decisions or perform operations based upon the number of matched features.

The feature matcher 330 may also be configured to calculate at least one recognition rate $R_q$. In some embodiments, the recognition rate $R_q$ may be a rate computed for a sub-region 205 of an image. In other embodiments, the recognition rate may be a cumulative rate, as expressed in the following equation.

$$R_q = \frac{\sum_{i=1}^{i=q-1} R_i}{q-1} \quad (2)$$

In EQ. 2, the summation is over all previously analyzed sub-regions in an image frame, and the recognition rate represents a current cumulative average. The feature matcher 330 may communicate the recognition rate to search window controller 350.

Search window loader 355 may comprise digital and/or analog hardware, software executing on at least one processor, one or more field-programmable gate arrays, or a combination thereof configured to receive search window size and/or search window location information from the search window controller 350, and to selectively provide corresponding search window data from the buffer 325 to the feature matcher 330. The search window loader 355 may retrieve data from the buffer 325 based upon the search window size and search window location data received from the search window controller 350.

Search window controller 350 may comprise digital and/or analog hardware, software executing on at least one processor, one or more field-programmable gate arrays, or a combination thereof configured to compute a search window size and/or a search window location that is to be used by the feature matcher 330 when evaluating a match between at least one feature of a currently processed image with features of one or more previously processed images. According to some embodiments, the search window controller 350 may receive motion vector data or motion estimation data from the video encoder 340. The motion vector or motion estimation data may be used by the search window controller 350 to compute a location for a search window to be used for a successive image frame.

For example and in reference to FIGS. 4A-4B, an image frame N (FIG. 4A) may be processed and motion vectors 410 computed for one or more sub-regions, e.g., seven sub-regions as depicted in the drawing. The motion vectors may indicate that features within those sub-regions are shifting in a first direction (to the right) by a distance approximately equal to a sub-region width during an inter-frame time interval. Accordingly, for each of the sub-regions, search window controller 350 may compute a location for a search window to be used in a next frame N+1 (FIG. 4B) that is shifted in the first direction by the distance indicated by the motion vector. For example, based upon a motion vector 410 computed for the sub-region in frame N, the search window controller 350 may compute a location for a search window used in frame N+1 to be centrally located at the sub-region $S_{i,j+1}$.

Although FIG. 4A shows similar motion vectors for each of the seven sub-regions, in practice the motion vectors may vary in magnitude and direction from sub-region to sub-region. In some embodiments, search window locations may be computed by the search window controller 350 based upon global averages of motion vectors, or local averages of motion vectors. Global and/or local averages may be computed from a table or other data structure that associates motion vector and/or motion estimation data with each sub-region or a portion thereof.

The size of the search window may be determined by the search window controller 350 in several manners. In a first aspect, the size of the search window may be set to a fixed value, e.g., a size containing a sub-region at the expected location and its nearest neighbors. In the example above, a fixed-size search window using nearest neighbors would comprise the nine sub-regions that include a central sub-region $S_{i,j+1}$. Accordingly, features detected in sub-region $S_{i,j}$ of frame N (three interest points and associated descriptor data) would be compared each against all features in the nine sub-regions of frame N+1 centered at sub-region $S_{i,j+1}$ (16 interest points and associated descriptor data) for a total of 48 comparisons.

The size and location of a search window need not be of equal dimensions in horizontal and vertical directions, with respect to an image frame, and need not be square or rectangular. Additionally, a search window size and location may not be limited to increments of sub-region 225 sizes or locations. Fractional values of sub-regions may be used, and a search window may be expressed in terms of pixels.

In a second aspect, the size of the search window may be adaptively controlled based upon a recognition rate $R_q$ described above. For example, a horizontal width and a vertical height for a search window may be computed based on the following expressions.

$$N_h = K_h \times \frac{f(V_{h,N-1})}{R_q} \quad (3a)$$

$$N_v = K_v \times \frac{f(V_{v,N-1})}{R_q} \quad (3b)$$

$N_h$ and $N_v$ may represent a number of sub-regions or pixels in the horizontal and vertical directions, respectively. $K_h$ and $K_v$ may be scaling constants that are pre-selected or determined based on training image data. The expressions $f(V_{h,N-1})$ and $f(V_{v,N-1})$ represent functional dependencies upon a horizontal motion vector magnitude and vertical motion vector magnitude, respectively, calculated for a corresponding sub-region in an $N-1^{th}$ image frame.

In some cases when the recognition rate is high, EQS. 3a and 3b may lead to a search window of approximately the same size as a corresponding sub-region in a previous image frame. Continuing with the example above, and referring again to FIGS. 4A and 4B, a search window computed for the frame N+1 by the search window controller 350 may be located at and approximately the same size of sub-region $S_{i,j+1}$. In this case, features detected in sub-region $S_{i,j}$ of frame N (three interest points and associated descriptor data) would be compared each against three features in the sub-region $S_{i,j+1}$ of frame N+1 (3 interest points and associated descriptor data) for a total of 9 comparisons. Accordingly, an appreciable reduction in processing and data handling associated with feature matching may be achieved.

Although the feature matching described above calculates a search window size for a subsequent frame (N+1) that is used to identify features for comparison against features in a sub-region of a previous frame (N), an analogous process may be employed in some embodiments in which a search window size is computed for a previous frame (N−1) that is used to identify features of the previous frame for comparison against features in a sub-region of a current frame (N).

In some cases, the recognition rate $R_q$ may fall to a low value and the resulting search window size computed by the search window controller 350 may become unacceptably large. To prevent excessively sized search windows, the values of $N_h$ and N may be clipped at predetermined levels, e.g., $N_{hmax}$ and $N_{vmax}$, which may be selected by a user or determined based upon training runs using training image data. Accordingly, if $N_h > N_{hmax}$ is found, then a value for $N_h$ will be set as $N_h = N_{hmax}$. A similar setting for N would apply.

Once a search window size and location are computed by the search window controller 350, the size a location information may be communicated to the search window loader 355. The search window loader may generate addresses for buffer 325 and retrieve the appropriate feature data based upon the search window size and location information. The feature data may then be forwarded to feature matcher 330 for matching computations.

The apparatus depicted in FIGS. 3A and 3B may be implemented on a single device, or may be implemented on separate devices. For example, an interest point detector 320, descriptor 322, video encoder 340, feature matcher 330, buffer 325, and search window controller 350 may be implemented on a device 100, in some embodiments. In some embodiments, the device may further include image capture apparatus. In other embodiments, a portion of the components may be implemented on a first device, e.g., a mobile electronic device such as a mobile phone, and a portion of the components may be implemented on a second device or second devices in communication with the first device.

Figure 5:
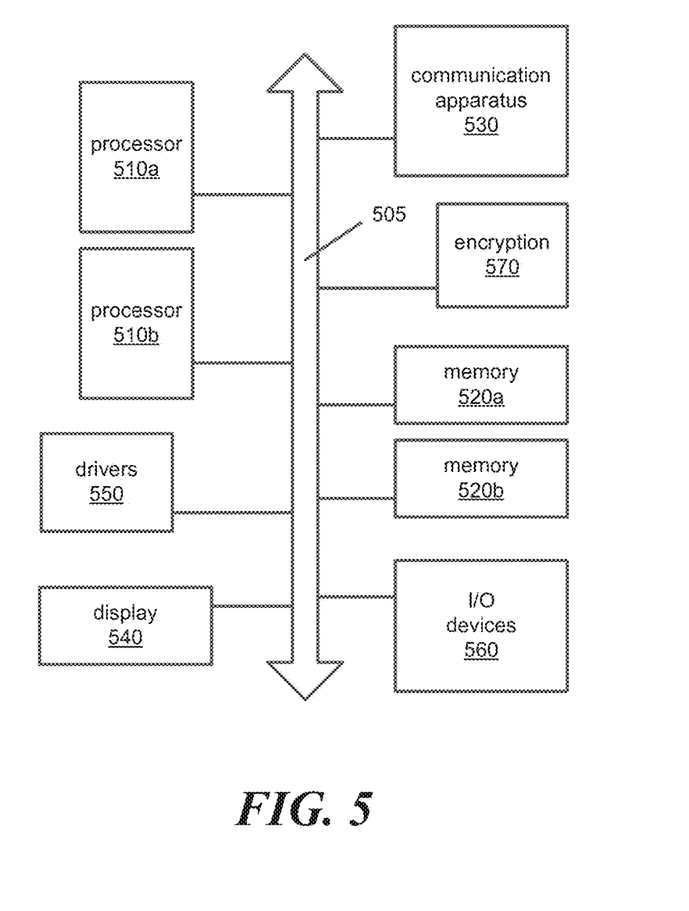
FIG. 5 depicts components of a device that may be used in some embodiments of the present technology.

Referring now to FIG. 5, an electronic device 100 (FIG. 1) configured to implement adaptive search window control may further comprise at least one processor 510a, 510b and related hardware. The at least one processor may be configured to control and provide user interaction for operating the device 100. The at least one processor may be used in combination with some or all of the system components described above in connection with FIGS. 3A-3B. In some implementations, some or all of the components shown in FIGS. 3A-3B may be implemented via machine-readable instructions executed on the at least one processor 510a, 510b. When in operation, an operating system may execute on at least one processor and provide for user interaction and operation of the electronic device 100, which may include running multiple software applications and/or programs on the device. The at least one processor may be used in combination with memory 520a, 520b that may be used to store machine-readable instructions, image data, feature data, search window data, and/or other data associated with image processing. The memory may include any type and form of RAM-type memory device and/or ROM-type memory device. Other data that may be stored may include, but are not limited to, interest point data, interest point threshold data, motion estimation data, motion vector data, descriptor data, recognition rate data, and match results. Some data may be stored temporarily in ring buffers and selectively transferred to long-term storage. Stored data or generated data may be communicated, via a wireless or wired link, to one or more devices in a network.

According to some embodiments, a processor 510a, 510b may comprise any type and form of data processing device, e.g., any one or combination of a microprocessor, microcontroller, a digital signal processor, an application specific integrated circuit (ASIC), and at least one field-programmable gate array (FPGA). There may be more than one processor in the system in some embodiments, e.g., dual core or multi-core processors, or plural processors communicating with at least one controlling processor. In some embodiments, one or more of the image processing system components may be implemented by a dedicated FPGA or ASIC.

The electronic device may further include a display 540 (e.g., comprising any one or combination of a video monitor, an LCD display, a plasma display, an alpha-numeric display, LED indicators, a touch screen, etc.). The electronic device 100 may include one or more input/output devices 560 (e.g., keyboard, touchpad, buttons, switches, touch screen, microphone, speaker, printer), and communication apparatus 530 (e.g., networking software, networking cards or boards, wireless transceivers, and/or physical sockets). The electronic device 100 may include device drivers 550, e.g., software modules specifically designed to execute on the one or more processor(s) and adapt the processor(s) to communicate with and control system components. In some embodiments, the device may include encryption/decryption hardware and/or software 570 that may be used to encrypt selected outgoing data transmissions and decrypt incoming encrypted data transmissions. Components of the electronic device 100 may communicate over a bus 505 that carries data and control signals between the components. The bus may provide for expansion of the system to include other components not shown in FIG. 5.

Figure 6:
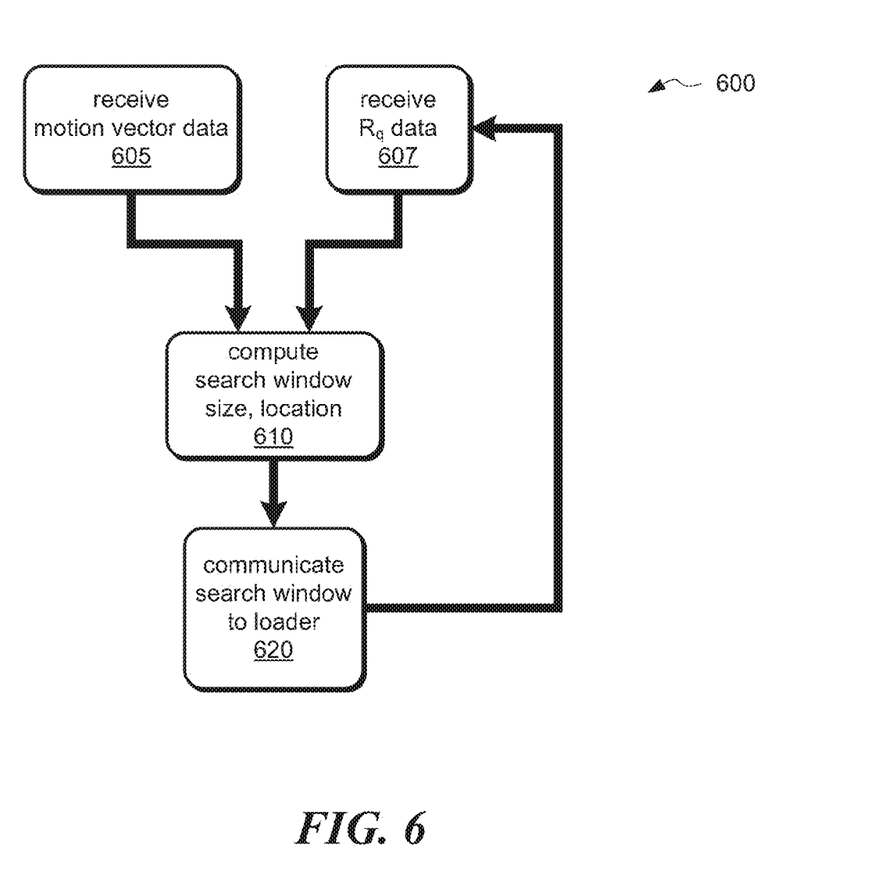
FIG. 6 depicts acts of an image processing method implementing adaptive search window control, according to some embodiments.

An embodiment of an image processing method 600 for adaptive search window control is depicted in the flow chart of FIG. 6. According to some embodiments, an image processing method may comprise receiving motion vector data 605, e.g., by a search window controller, wherein the motion vector data may be representative of motion of interest points within an image, e.g., within an image sub-region. The motion vector data may be computed for a sub-region of a previous image frame in a video sequence of image frames. The method 600 may further comprise receiving recognition rate data 607 from a feature matcher, for example. The received recognition rate data $R_q$ may be computed by a feature matcher when comparing features of the previous image frame in the video sequence with features of a currently processed image frame in the sequence.

According to some embodiments, image processing method 600 may further comprise computing 610, by the search window controller, a search window size and/or location that is to be used by a feature matcher. The computed search window size may be appreciably less than a size of an image frame. The computed size and location may be based upon the received motion vector data and recognition rate data.

The image processing method 600 may further comprise communicating 620, by the search window controller, the search window size and/or location information to a search window loader. The search window loader may use the size and/or location information to retrieve feature data from a buffer and forward the feature data to a feature matcher. The steps of the image processing method 600 may be repeated for a plurality of sub-regions of a currently processed image frame.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An image processing system, comprising:
one or more memories; and
image processing circuitry, which, in operation:
controls a search window location of a search window associated with an image frame based on a motion vector associated with a sub-region of a previously processed image frame; and controls a size and shape of the search window in response to a determined recognition rate, wherein the image processing circuitry, in operation, controls horizontal and vertical dimensions of the search window based on the motion vector associated with the sub-region of the previously processed image frame, according to:

$$N_h = K_k \times \frac{f(V_{h,N-1})}{R_q}; \text{ and}$$

$$N_v = K_v \times \frac{f(V_{v,N-1})}{R_q},$$

where $N_h$ is a horizontal size in pixels or sub-regions, $N_v$ is a vertical size in pixels or sub-regions, $K_h$ is a horizontal scaling constant, $K_v$ is a vertical scaling constant, $f(V_{h, N-1})$ represents a functional dependency on a horizontal magnitude of the motion vector associated with the sub-region of the previously processed image frame, $f(V_{v, N-1})$ represents a functional dependency on a vertical magnitude of the motion vector associated with the sub-region of the previously processed image frame, and $R_q$ represents the determined recognition rate.

2. The image processing system of claim 1, wherein the image processing circuitry comprises a field-programmable gate array.

3. The image processing system of claim 1 wherein the determined recognition rate is based on feature matching.

4. The image processing system of claim 1 wherein the image processing circuitry, in operation, encodes received video data and computes the motion vector.

5. The image processing system of claim 4 wherein the image processing circuitry, in operation, encodes video data according to a standardized format.

6. The image processing system of claim 5, wherein the standardized format comprises a MPEG or H264 format.

7. The image processing system of claim 1 wherein the image processing circuitry, in operation:
retrieves feature data from the one or more memories based upon the size of the search window; and
matches feature data for at least one feature of the image frame associated with the window against the feature data retrieved from the buffer.

8. The image processing system of claim 7 wherein the image processing circuitry, in operation, outputs optical flow data based upon matching results of feature data.

9. The image processing system of claim 7, comprising:
an integrated circuit including the one or more memories and the image processing circuitry, wherein the one or more memories include a buffer, which, in operation, stores feature data.

10. A method, comprising:
controlling, using image processing circuitry, a search window location of a search window associated with an image frame based on a motion vector associated with a sub-region of a previously processed image frame; and
controlling, using the image processing circuitry, a size and shape of the search window in response to a determined recognition rate, wherein the controlling the size and shape of the search window comprises controlling horizontal and vertical dimensions of the search window based on the motion vector associated with the sub-region of the previously processed image frame, according to:

$$N_h = K_k \times \frac{f(V_{h,N-1})}{R_q}; \text{ and}$$

$$N_v = K_v \times \frac{f(V_{v,N-1})}{R_q},$$

where $N_h$ is a horizontal size in pixels or sub-regions, $N_v$ is a vertical size in pixels or sub-regions, $K_h$ is a horizontal scaling constant, $K_v$ is a vertical scaling constant, $f(V_{h, N-1})$ represents a functional dependency on a horizontal magnitude of the motion vector associated with the sub-region of the previously processed image frame, $f(V_{v, N-1})$ represents a functional dependency on a vertical magnitude of the motion vector associated with the sub-region of the previously processed image frame, and $R_q$ represents the determined recognition rate.

11. The method of claim 10 wherein the image processing circuitry comprises a field-programmable gate array.

12. The method of claim 10, comprising generating, using the image processing circuitry, the determined recognition rate based on feature matching.

13. The method of claim 10, comprising:
encoding, received video data; and
computing the motion vector data.

14. The method of claim 13 wherein the encoding comprises encoding the received video data according to a standardized format.

15. The method of claim 14 wherein the standardized format comprises a MPEG or H264 format.

16. The method of claim 10, comprising:
retrieving feature data from a buffer based upon the size of the search window; and
matching feature data for at least one feature of the image frame associated with the window against the feature data retrieved from the buffer.

17. The method of claim 16, comprising outputting optical flow data based upon matching results of feature data.

18. A system, comprising
an image capture apparatus; and
image processing circuitry communicatively coupled to the image capture apparatus, wherein the image processing circuitry, in operation:
controls a search window location of a search window associated with an image frame based on a motion vector associated with a sub-region of a previously processed image frame; and
controls a size and shape of the search window in response to a determined recognition rate, wherein the image processing circuitry, in operation, controls horizontal and vertical dimensions of the search window according to:

$$N_h = K_k \times \frac{f(V_{h,N-1})}{R_q}; \text{ and}$$

$$N_v = K_v \times \frac{f(V_{v,N-1})}{R_q},$$

where $N_h$ is a horizontal size in pixels or sub-regions, $N_v$ is a vertical size in pixels or sub-regions, $K_h$ is a horizontal scaling constant, $K_v$ is a vertical scaling constant, $f(V_{h, N-1})$ represents a functional dependency on a horizontal magnitude of the motion vector associated with the sub-region of the previously processed image frame, $f(V_{v, N-1})$ represents a functional dependency on a vertical magnitude of the motion vector associated with the sub-region of the previously processed image frame, and $R_q$ represents the determined recognition rate.

19. The system of claim 18 wherein the image processing circuitry comprises a field-programmable gate array.

20. The system of claim 18 wherein the determined recognition rate is based on feature matching.

* * * * *

UNITED STATES PATENT AND TRADEMARK OFFICE
CERTIFICATE OF CORRECTION

PATENT NO. : 9,569,695 B2
APPLICATION NO. : 13/869656
DATED : February 14, 2017
INVENTOR(S) : Danilo Pietro Pau et al.

It is certified that error appears in the above-identified patent and that said Letters Patent is hereby corrected as shown below:

In the Claims

Column 14, Lines 8 and 9 Claim 1:

$$N_h = K_h \times \frac{f(V_{h,N-1})}{R_q}; \text{ and}$$

$$N_v = K_v \times \frac{f(V_{v,N-1})}{R_q}.$$

Should read:

$$N_h = K_h \times \frac{f(V_{h,N-1})}{R_g}; \text{ and}$$

$$N_v = K_v \times \frac{f(V_{v,N-1})}{R_g}.$$

Column 15, Lines 1 and 2 Claim 10:

$$N_h = K_h \times \frac{f(V_{h,N-1})}{R_q}; \text{ and}$$

$$N_v = K_v \times \frac{f(V_{v,N-1})}{R_q}.$$

Signed and Sealed this
Fourth Day of July, 2017

Joseph Matal
*Performing the Functions and Duties of the*
*Under Secretary of Commerce for Intellectual Property and*
*Director of the United States Patent and Trademark Office*

Should read:

$$N_h = K_h \times \frac{f(V_{h,N-1})}{R_q} ;\text{ and}$$

$$N_v = K_v \times \frac{f(V_{v,N-1})}{R_q}.$$

Column 16, Lines 15 and 16 Claim 18:

$$N_h = K_h \times \frac{f(V_{h,N-1})}{R_q} ;\text{ and}$$

$$N_v = K_v \times \frac{f(V_{v,N-1})}{R_q}.$$

Should read:

$$N_h = K_h \times \frac{f(V_{h,N-1})}{R_q} ;\text{ and}$$

$$N_v = K_v \times \frac{f(V_{v,N-1})}{R_q}.$$